(12) United States Patent
Johnson

(10) Patent No.: US 6,441,822 B1
(45) Date of Patent: Aug. 27, 2002

(54) DRAWING WITH CIRCULAR ARCS

(76) Inventor: Bruce H. Johnson, 1875 E. County Road F, White Bear Lake, MN (US) 55110

( * ) Notice: Subject to any disclaimer, the term of this patent is extended or adjusted under 35 U.S.C. 154(b) by 0 days.

(21) Appl. No.: 09/395,274

(22) Filed: Sep. 13, 1999

Related U.S. Application Data

(60) Provisional application No. 60/127,553, filed on Apr. 2, 1999.

(51) Int. Cl.[7] .............................................. G06T 11/20
(52) U.S. Cl. ........................ 345/442; 33/23.05; 345/15
(58) Field of Search ................................ 345/441, 442, 345/467, 17, 23–26, 16, 15, 443; 382/242, 205, 204; 33/23.05, 23.08; 52/80.1, 245

(56) References Cited

U.S. PATENT DOCUMENTS

| | | | | |
|---|---|---|---|---|
| 4,835,722 A | * | 5/1989 | Clarke et al. ................ | 708/275 |
| 4,864,520 A | * | 9/1989 | Setoguchi et al. ........... | 345/419 |
| 5,333,248 A | * | 7/1994 | Christensen ................. | 345/442 |
| 5,408,598 A | * | 4/1995 | Pryor, Jr. .................... | 345/442 |
| 5,410,645 A | * | 4/1995 | Ooka et al. .................. | 345/442 |
| 5,500,927 A | * | 3/1996 | Sander-Cederlof et al. . | 345/433 |
| 5,579,415 A | * | 11/1996 | Takano et al. ............... | 382/282 |
| 5,590,250 A | * | 12/1996 | Lamping et al. ............. | 345/427 |
| 5,795,154 A | * | 8/1998 | Woods ......................... | 434/87 |
| 6,103,074 A | * | 8/2000 | Khominich .................. | 204/192 |
| 6,212,484 B1 | * | 4/2001 | Chen ............................. | 703/2 |
| 6,233,351 B1 | * | 5/2001 | Feeney et al. ............... | 382/155 |

* cited by examiner

*Primary Examiner*—Michael Razavi
*Assistant Examiner*—Thu-Thao Havan
(74) *Attorney, Agent, or Firm*—Jacobson & Johnson

(57) ABSTRACT

A method of generation of smoothly shaped, non-circular, curves by formation of multiple circular arcs. In the method, one draws a first circular arc which passes through two points and is tangent to a first line extending from a first point in the indicated direction. Next, one repeats the process by drawing a second circular arc which passes through one of the aforementioned two points and a third point and is tangent to an extending line. By utilizing of a common point for each of the two circular arcs one can generate a smooth, non-circular, curve from the end blending of the two circular arcs. By moving or deleting points, or by adding points, or by changing the defined directed tangent line, or by defining a directed tangent line at a different point, one can reconfigure the curve into the desired final curve. Several curves can be combined to generate a desired figure.

8 Claims, 8 Drawing Sheets

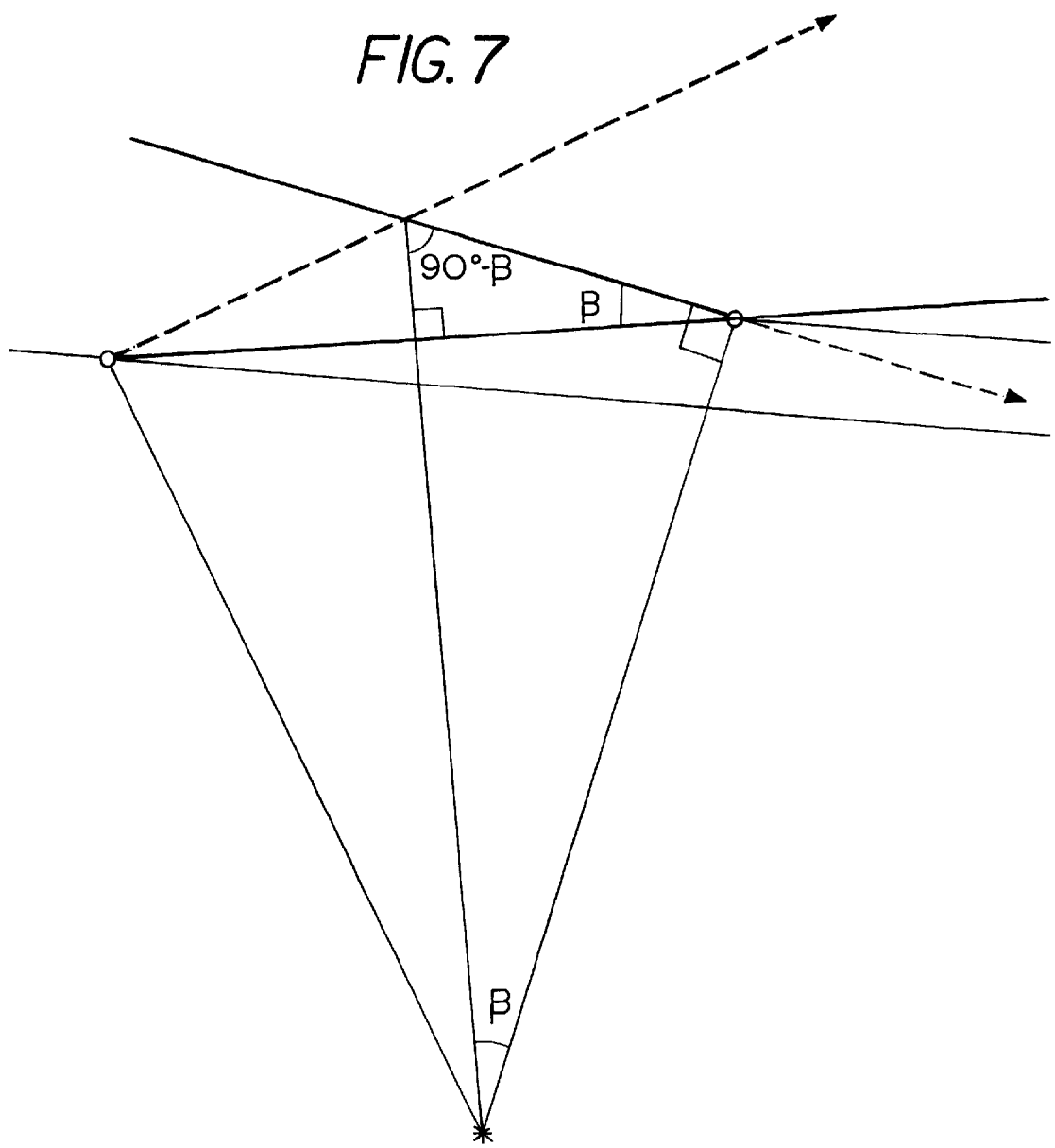

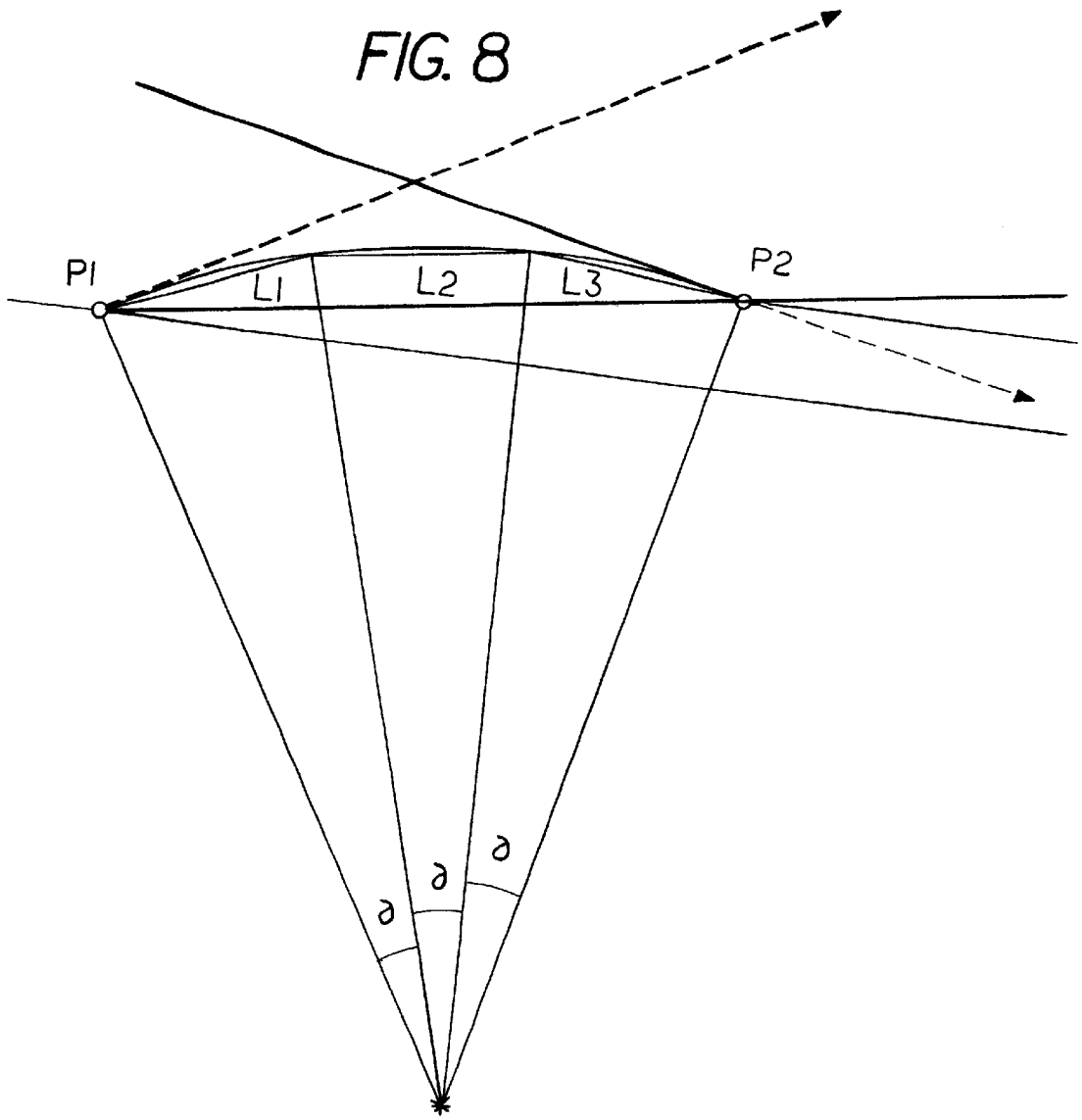

DRAWING WITH CIRCULAR ARCS

This application claim benefit to Provisional Application Ser. No. 60/127,553 filed Apr. 2, 1999.

FIELD OF THE INVENTION

This invention relates generally to drawing with a computer and, more specifically to drawing a smoothly shaped, non-circular, curve by blending a plurality of circular arcs.

BACKGROUND OF THE INVENTION

There are many computer programs available for generating complex shapes; however, if a user wants to generate a particular smoothly shaped, non-circular, figure such as a heart or other similar figures it is difficult to generate such a smoothly shaped, non-circular, curve from existing programs. The present invention provides a method for forming a smoothly shaped, non-circular, curve by generation of multiple circular arcs that are blended together with each of the circular arcs extending through two points and each of the arcs positioned such that the arcs have a common tangent at a common consecutive point.

In the present invention, a smoothly shaped, non-circular, curve is generated by forming a series of separate circular arcs which adhere to a predetermined pattern. That is, to form a smoothly shaped, non-circular, curve, a first circular arc is drawn that passes through two points, is tangent to a first directed tangent line, and is in the direction indicated by the first directed tangent line. Similarly, a second circular arc is drawn that is tangent to the first arc at one of the aforementioned points and passes through a third point to form a smoothly shaped, non-circular, curve comprised of the first circular arc and the second circular arc with a common tangent. Similarly, for more complex curves, a greater number of circular arcs can be connected together.

SUMMARY OF THE INVENTION

Briefly, the present invention comprises a method of generating a smoothly shaped, non-circular, curve, by the formation of multiple circular arcs with common tangents. In the method, one draws a first circular arc which passes through two points and is tangent to a first line extending from a first point in a direction indicated by the line. Next, one repeats the process by drawing a second circular arc which passes through one of the aforementioned two points and a third point and has a common tangent with the first arc at the common point. By utilizing a common point with a common tangent for each of the two circular arcs, one can generate a smoothly shaped, non-circular, curve from the blending of the two circular arcs.

BRIEF DESCRIPTION OF THE DRAWINGS

FIG. 3b shows a complete heart shape formed by adding a mirror image of the partial heart shape of FIG. 3a;

FIG. 7 shows the first step of an alternate method of forming a smoothly shaped curve by forming multiple straight-line segments between selected points; and FIG. 8 shows the second step in the formation of a circular arc by formation of multiple segment lines between the selected points of FIG. 7.

DESCRIPTION OF THE PREFERRED EMBODIMENT

The present method of formation of a smoothly shaped, non-circular, curve is well suited for use in a computer drawing program as the necessary computations can be computed and graphically illustrated to the operator.

Figure 1:
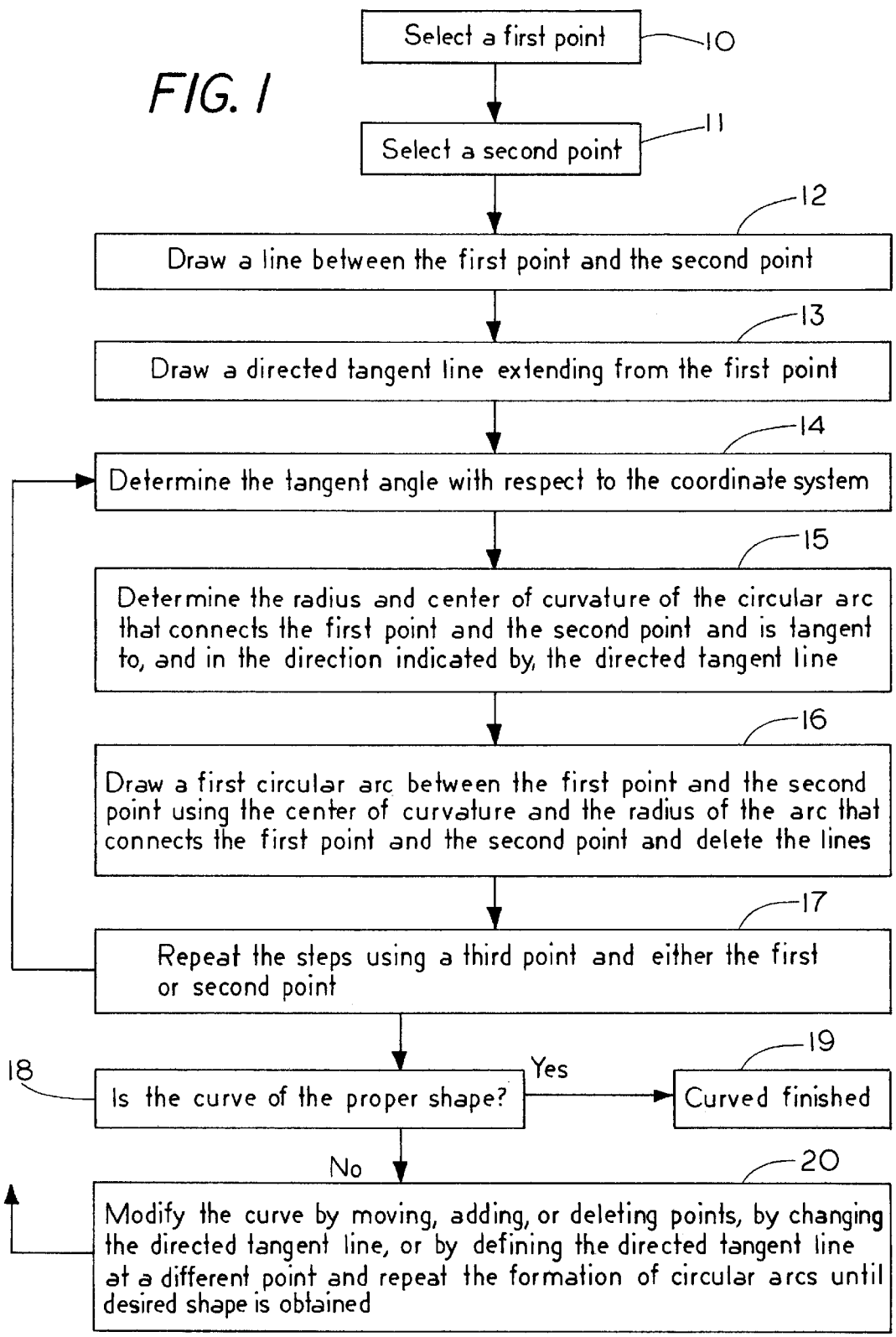
FIG. 1 is a flow chart of the process of drawing a smoothly shaped, non-circular, curve by formation of circular arcs.

FIG. 1 shows a flow chart of the process of drawing a smoothly shaped, non-circular, curve in a computer program by formation of a plurality of circular arcs with common tangents. In the method of the invention, block 10 shows one selects a first point and block 11 shows one selects a second point different from the first point. Block 12 shows that a first line is temporarily generated between the first point and the second point to show the connection. Block 13 includes the step of temporarily generating a first directed tangent line extending from the first point with the direction of the tangent line indicating the direction the arc takes in getting to the next point as opposed to the complementary arc. Block 14 includes the step of determining a first tangent angle with respect to the coordinate system from the directed tangent line. In block 15 one determines the radius and center of curvature of the circular arc that connects the first point and the second point and is tangent to, and in the direction of, the directed tangent line. Block 16 includes the generation of a first circular arc between the first point and the second point using the radius and center of curvature of the circular arc determined in block 15. Block 17 includes the repeating of the process of selecting a point and proceeding to block 14 and then continuing through the steps outlined in the blocks until block 17 is reached. If the smoothly shaped, non-circular, curve is of the proper shape as indicated by block 18, the curve is finished as indicated by block 19. However, if the smoothly shaped, non-circular, curve is not of the desired shape, the process of modifying the curve by moving, adding, or deleting points, by changing the directed tangent line, or by defining the directed tangent line at a different point and recomputing the circular arcs, is indicated by the return to the appropriate block. The process is then repeated processing through the blocks to block 18 until the desired curve is obtained.

Figure 2:
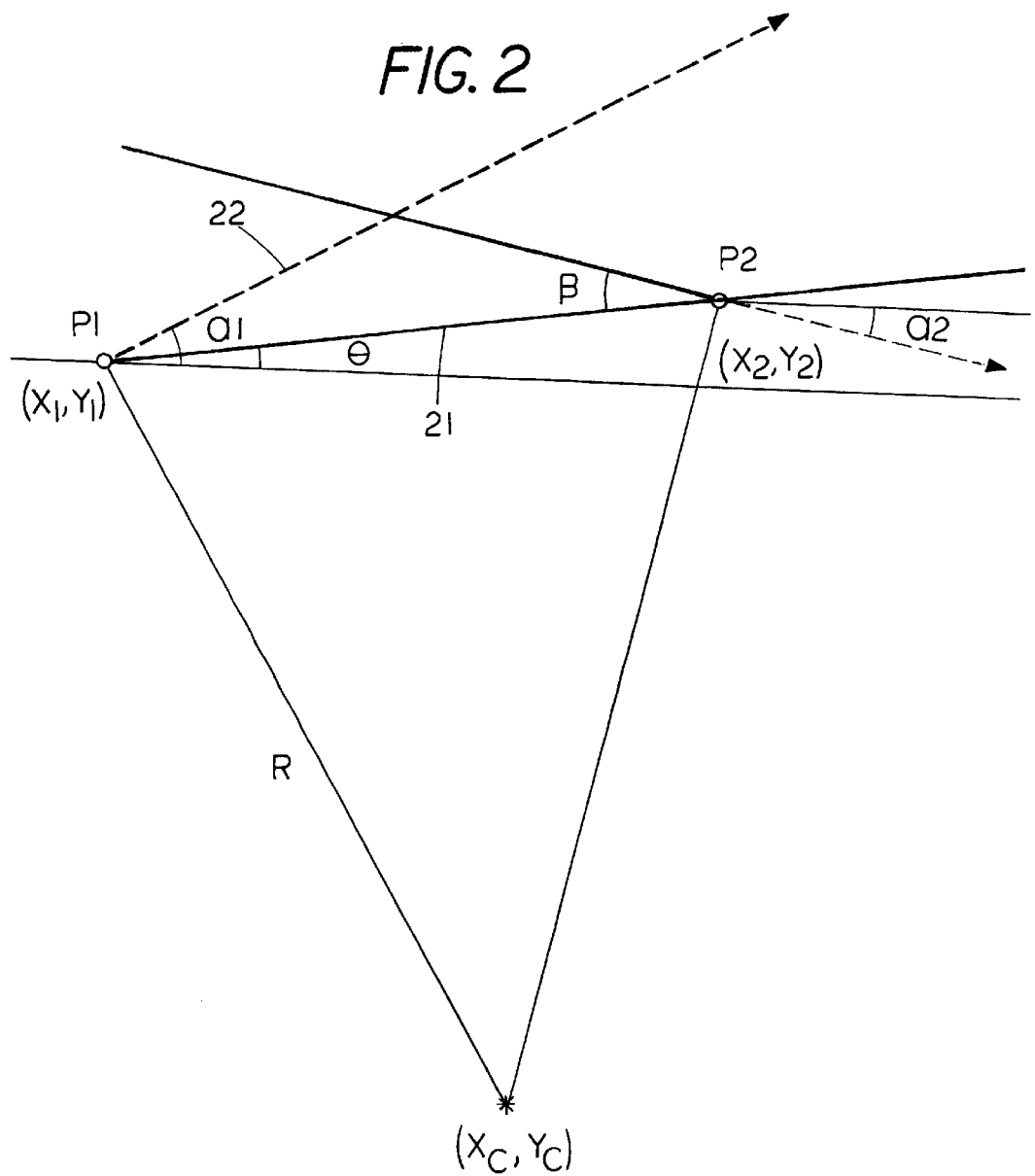
FIG. 2 shows the initial steps in the formation of a circular arc.

In order to visually reveal the method of formation of smoothly shaped, non-circular, curves by the generation of circular arcs, reference should be made to FIG. 2 which shows a first point $P_1$ $(x_1, y_1)$ and a second point $P_2$ $(x_2, y_2)$.

A first line 21 connects points $P_1$ and $P_2$ and a dashed directed tangent line 22 extends from point $P_1$ at an angle $\alpha_1$. By knowing the coordinates of points $P_1$ and $P_2$ and that a circular arc drawn through points $P_1$ and $P_2$ is also tangent to line 22 in the direction indicated by that line, one determines a radius of curvature R having as its center ($x_c$, $y_c$). Utilizing the radius and center of curvature, a circular arc can be formed between points $P_1$ and $P_2$. The tangent angle at the end of the arc, $\alpha_2$, will be the new initial tangent angle, $\alpha_1$, if another arc is to be added to the curve there.

Figure 3A:
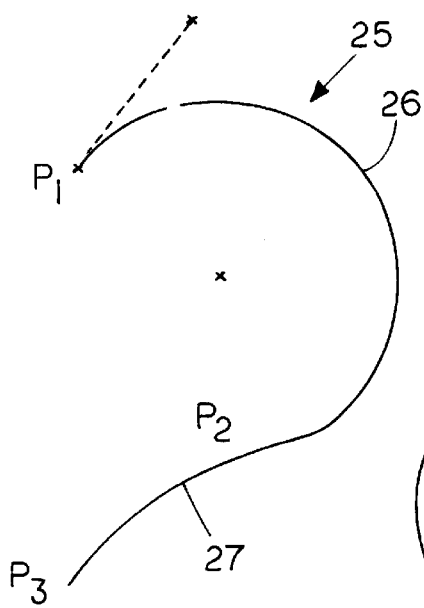
FIG. 3a shows an example of a partial heart shape formed by two circular arcs.

FIG. 3a shows an example of a portion of a heart shape 25 that is formed by a first circular arc 26 extending between points $P_1$ and $P_2$ and a second circular arc 27 formed between points $P_2$ and $P_3$ with a common tangent at point $P_2$. The centers of curvature for the arcs are indicated by the x-shaped symbols.

Figure 3B:
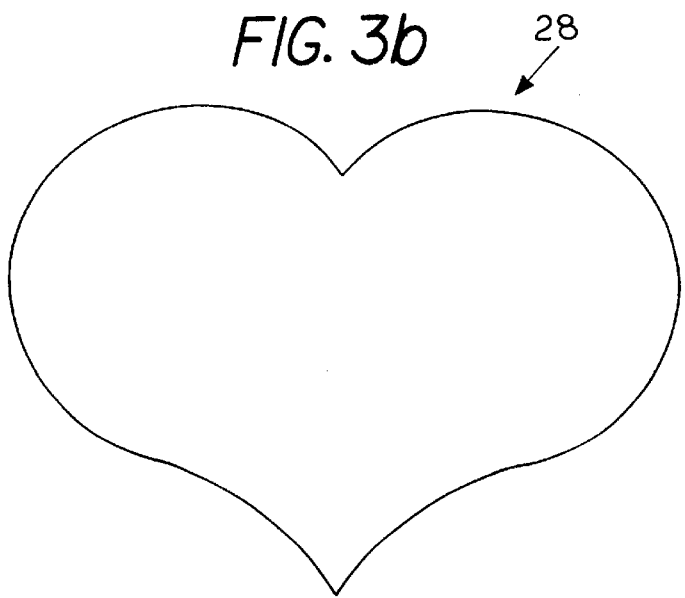

FIG. 3b shows a completion of heart shape 28 by adding a mirror image of the partial heart shape 25 shown in FIG. 3a.

Figure 3C:
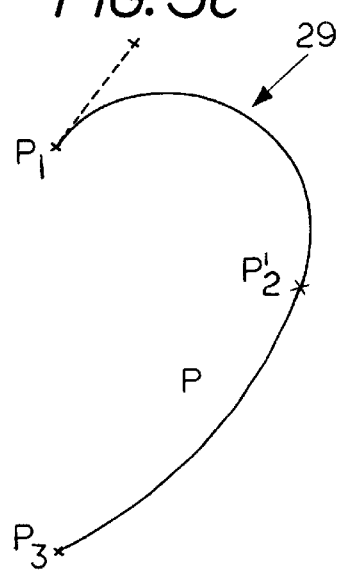
FIG. 3c shows the partial heart shape of FIG. 3a alternated by moving a point and regenerating the connection circular arcs.

In the invention, if the process does not generate the desired shape, one way to reconfigure the shape is by selecting different coordinates for point $P_2$. FIG. 3c shows the partial heart shape of FIG. 3a alternated by selecting a different point $P'_2$ and regenerating the connecting circular arcs between points $P_1$ and $P'_2$ and $P'_2$ and $P'_3$ with a common tangent at point $P'_2$.

Figure 3D:
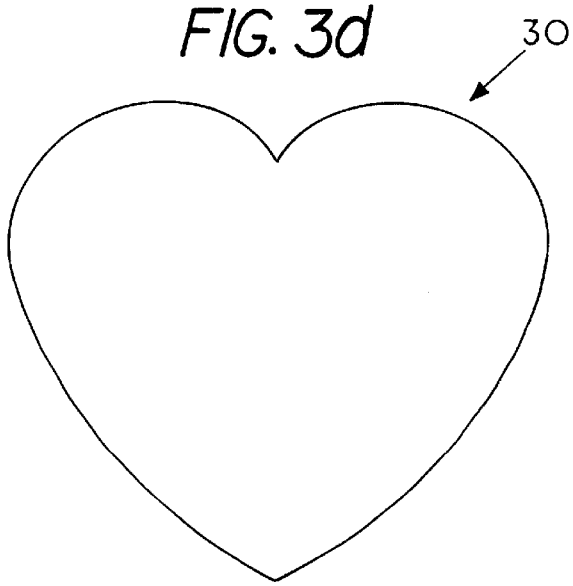
FIG. 3d shows a complete heart shape formed by adding a mirror image of the partial heart shape of FIG. 3c.

FIG. 3d shows the complete heart shape 30 formed by adding a mirror image of the half heart shape 29 of FIG. 3c.

Figure 4:
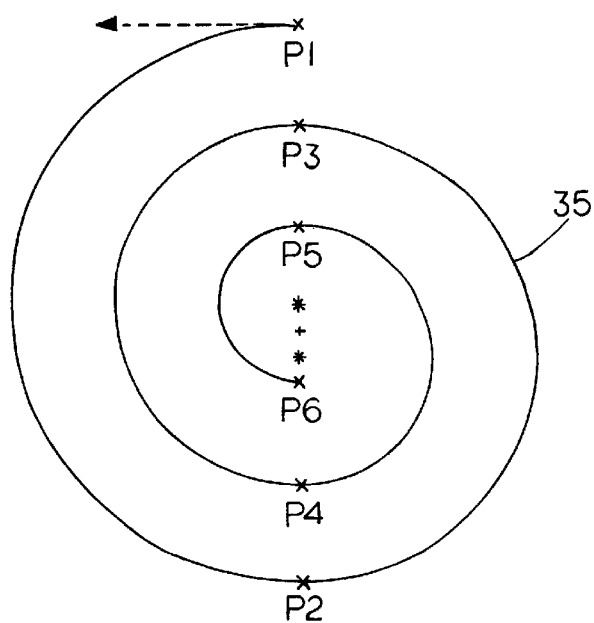
FIG. 4 shows an example of a spiral formed by the method of the invention.

FIG. 4 shows an example of a spiral 35 formed by the method of the invention using multiple points $P_1$, $P_2$, $P_3$, $P_4$, $P_5$ and $P_6$ and the single directed tangent line at point $P_1$.

Figure 5:
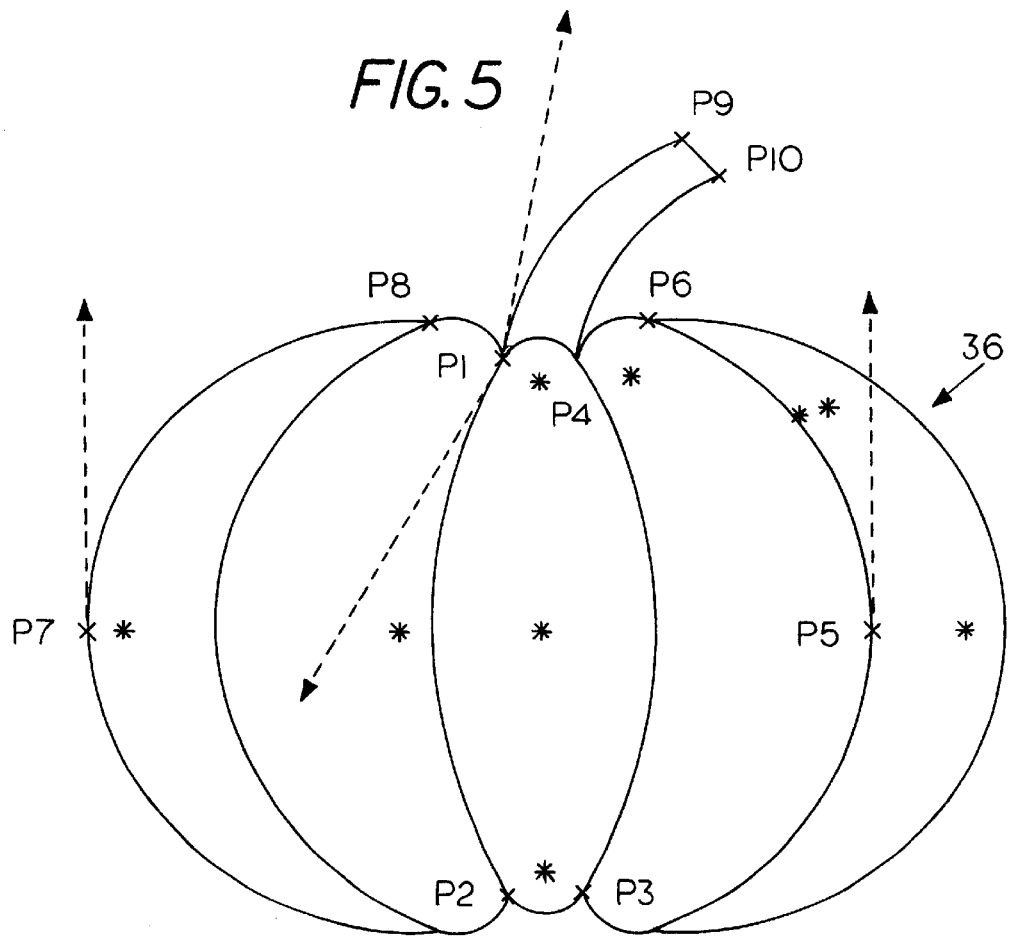
FIG. 5 shows an example of a more complex shape formed by the method of the invention.

FIG. 5 shows an example of a more complex shape 36 formed by the method of the invention wherein multiple points $P_1$, $P_2$, $P_3$, $P_4$, $P_5$, $P_6$, $P_7$, $P_8$, $P_9$ and $P_{10}$ are generated to form a pumpkin-like shape comprised of circular arcs. Some of the points that are apparently missing are supplied by symmetry.

Figure 6A:
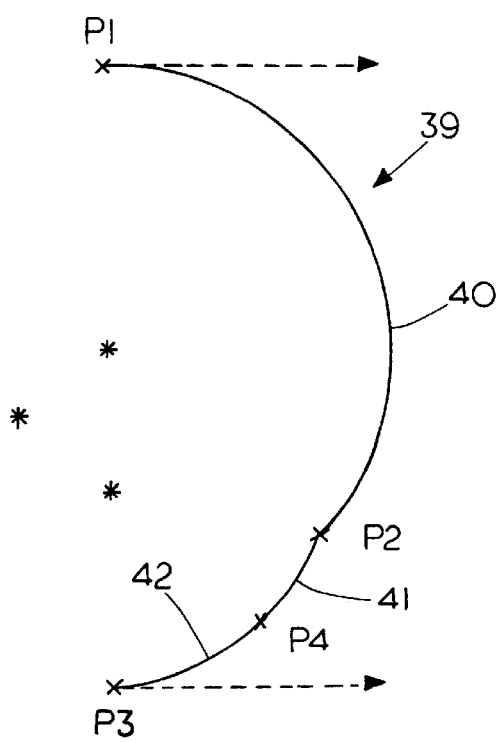
FIG. 6a shows an example of an egg-like shape formed by the method of the invention wherein a single-arc curve and a double-arc curve meet at a common point but without a common tangent.

FIG. 6a shows still another example, an egg-like FIG. 39 formed by the method of the invention wherein circular arc 40 is joined with the curve consisting of circular arcs 41 and 42 to form an egg-like shape 39, but without a common tangent where the two curves meet at point $P_2$.

Figure 6B:
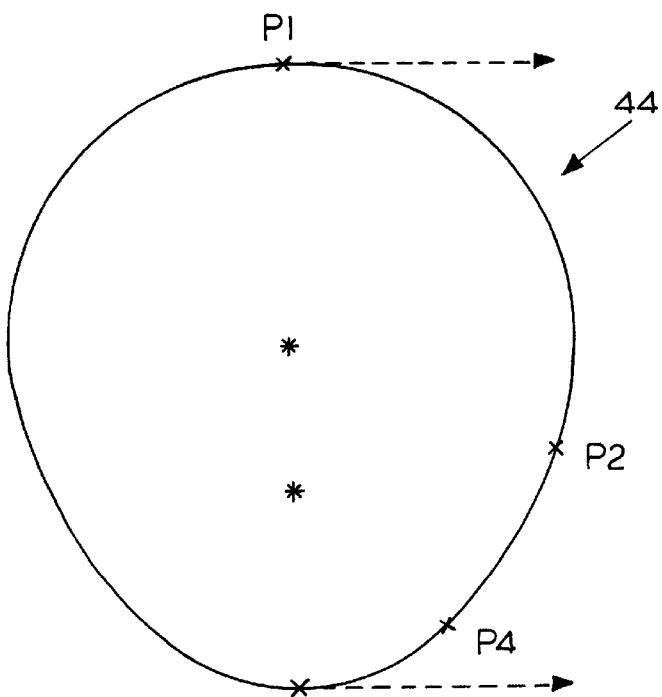
FIG. 6b shows the example of the egg-like shape of FIG. 6a modified by moving the common point until a common tangent is produced and adding a mirror image thereof.

FIG. 6b shows the example of the egg-like shape of FIG. 6a modified by moving the selected point $P_2$ by trial and error to form a common tangent there and adding a mirror image thereof.

Thus with the present invention one can generate a smoothly shaped, non-circular, curve by:

(a) selecting a first point;
(b) selecting a second point different from the first point;
(c) generating a directed tangent line which extends from the first point;
(d) determining a tangent angle with respect to the coordinate system with the vertex of the tangent angle located at the first point;
(e) determining the radius and center of curvature of a circular arc that connects the first point and the second point and is tangent to the directed tangent line in the direction indicated by the directed tangent line;
(f) drawing a first circular arc between the first point and the second point using the radius and center of curvature of the circular arc;
(g) selecting a third point different from the second point;
(h) calculating a second tangent angle with the vertex of the second tangent angle located at the second point;

(i) determining the radius and center of curvature of a second circular arc that connects the second point and the third point and is tangent to the second tangent angle;
(j) drawing a second circular arc between the second point and the third point to form a smooth, noncircular, curve with the first circular arc;
(k) reshaping the smooth, non-circular, curve by moving, adding, or deleting points, changing the defined directed tangent line, or by defining the directed tangent line at a different point until the curve is the desired shape; and
(l) combining several curves into a composite figure.

Thus the present invention provides a simple way for, especially, non-professional people to draw simple, but smooth, figures without knowing or caring about such technicalities as radii or centers of curvature.

Figure 9:
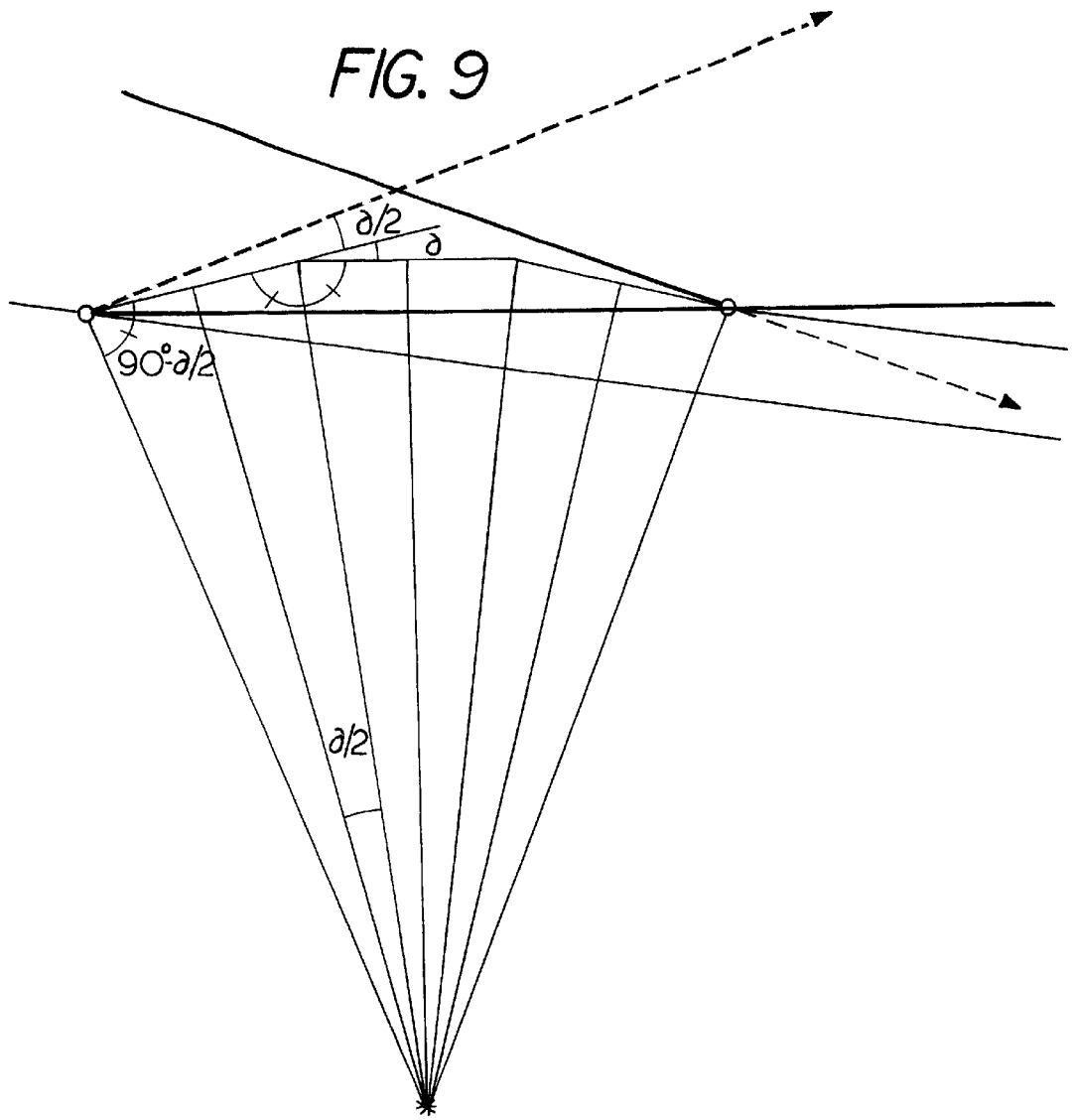
FIG. 9 shows the last step in the formation of a circular arc by formation of multiple segment lines between the selected points of FIG. 7.

In some cases the radius of curvature will be so large that the drawing coordinates for the center of the arcs would be off the drawing surface and consequently might not be usable with the drawing program. FIGS. 7–9 illustrate an alternate method of forming a smoothly shaped curve by forming multiple straight-line segments between selected points by dividing the distance between the two points into multiple straight-line segments with defined angles.

In order to address this scenario wherein the center coordinates of the circular arcs are off the drawing surface, the center coordinates and the radius need only be used in the calculating algorithm and need not show up on a drawing. This process can be obtained by replacing the arc with a series of straight-line segments.

In order to appreciate this approach, reference should be made to FIG. 7 which shows the included angle of the arc is $2\beta$. We can break this arc up into some number of equal sub-arcs, with each smaller included angle called $\delta$ as shown in FIG. 8.

To illustrate this example in FIG. 8, we assume three sub-arcs where we designate the chord of each sub-arc to be L.

Referring to FIG. 8 we have $$\frac{(L/2)}{R} = \sin(\delta/2) \Rightarrow L = 2 \cdot R \cdot \sin(\delta/2)$$

The line lengths and the angles for the segments replacing the arc are therefore defined, as shown in FIG. 9.

Based on the results, we can outline a procedure for generating a curve using circular arcs and straight lines given a series of points and a directed tangent line at any one of those points using the following procedure.

1. A series of defining points is input into the system by any of a variety of means. For most applications, this will probably be accomplished by pointing and clicking with a mouse on the computer screen.

2. At one of these points a directed tangent line will be defined by any of a variety of means. For most applications, this will probably be accomplished by clicking with a mouse on one of the existing points and clicking off that point and dragging to produce a straight line heading in the desired direction. The directed tangent line determines the initial tangent angle, $\alpha_1$, with respect to the coordinate system.

3. While the resulting curve will connect each of the points with a circular arc or a straight line in the order the points were defined, the computation procedure must start at the point where the directed tangent line has been defined. This point will be designated ($x_1$, $y_1$).

4. A point adjacent to $(x_1, y_1)$ will be designated $(x_2, Y_2)$. If there is more than one such adjacent point, we will arbitrarily select the one that was input immediately after $(x_1, y_1)$.

5. If $\tan \theta = \tan \alpha_1$ the radius of curvature is infinite, so we will construct a straight line from $(x_1, Y_1)$ to $(x_2, Y_2)$; otherwise, we will find an arc to connect the two points. The arc will be tangent to the directed tangent line at the point from which the directed tangent line originates and in the indicated direction.

6. If $x_2 = x_1$ and $y_2 > y_1$, then $\theta = 90°$.

7. If $x_2 = x_1$ and $y_2 < y_1$, then $\theta = -90°$.

8. If $x_2 \neq x_1$, solve for $\theta$.

9. Solve for $x_c$, $Y_c$ and R, the center coordinates and the radius for the circular arc.

10. Solve for $\beta$ and $\alpha_2$.

11. If the drawing package can handle drawing an arc when the center coordinates are off the designated drawing area, do so.

12. If the drawing package can't handle drawing an arc when the center coordinates are off the designated drawing area, we will need to break up the arc into some number of equal sub-arcs, each smaller included angle called $\delta$. We will assume the same algorithm used in drawing arcs in the drawing package can also determine a value for $\delta$. We will designate the chord of each sub-arc to be L.

(a) Solve for L.

(b) Draw the first straight-line segment at an angle of $(\alpha_1 - \delta/2)$ for a length of L, starting at the point at which the tangent angle, $\alpha_1$, is defined.

(c) Draw the next straight-line segment at an angle of $(\alpha_1 - 3\delta/2)$ for a length of L.

(d) Continue to draw straight-line segments of length L, in each case reducing the angle by a value of $\delta$ until the arc is completed.

13. If another arc is to be added at this point, the procedure is merely repeated, using the value of $\alpha_2$ from the last arc as the value of $\alpha_1$ for this new arc.

14. If an arc is to be added at the point where $\alpha_1$ was defined, the new value for $\alpha_1$ is taken to be $(\alpha_1 - 180°)$ and the procedure is repeated.

15. Any of the points can be moved and the directed tangent line can be modified; any of the points except the one used to define the directed tangent line can be deleted. The same procedure is merely repeated.

16. In order to add points, we have to define the order of the points. For most applications, this will probably be accomplished by clicking with a mouse between two existing points, near the generated arc or straight line.

With this procedure, a curve can contain an unlimited number of points but only one directed tangent line can be defined for that curve. The curve can close on itself, but the end of the curve will not necessarily be tangent to the beginning of the curve. In order to force the curve to close on itself with matching tangents, the defined directed tangent line can be iterated or one or more points can be moved to achieve this condition.

As indicated earlier with the egg-shaped figure, it is also possible to join two separate curves at a common point with a common tangent by iterating the location of the common point. In order for this iteration to have a single solution the common point must be constrained in some way. For most applications, this would probably involve clicking with a mouse on one of the two arcs meeting at the common point, indicating that the radius of the indicated arc is to remain constant. This iteration process may not be able to find a solution with the chosen constraint, so another constraint would have to be chosen.

I claim:

1. A method of drawing a smoothly shaped, non-circular, curve in a computer program comprising the steps of:

selecting a first point;

selecting a second point different from the first point;

generating a first directed tangent line which extends from the first point;

determining a first tangent angle with respect to a coordinate system with a vertex of the first tangent angle located at the first point;

determining a radius and center of curvature of a first circular arc that connects the first point and the second point and is tangent to the first directed tangent line;

drawing the first circular arc between the first point and the second point using the radius and center of the curvature of the first circular arc;

selecting a third point different from the second point;

determining a second tangent angle with a vertex of the second tangent angle located at the second point;

determining a radius and center of curvature of a second circular arc that connects the second point and the third point and is tangent to the first circular arc;

drawing the second circular arc between the second point and the third point to form a smoothly shaped, non-circular, curve with the first circular arc; and reshaping the smoothly shaped, non-circular, curve by moving at least one of the points, adding additional points, changing the directed tangent line, or by defining the directed tangent line at a different point.

2. A method to draw a smoothly shaped, non-circular, curve using multiple circular arcs comprising:

(a) selecting a pair of spaced apart points;

(b) selecting a directed tangent line extending from one of the spaced apart points;

(c) determining a center and radius of curvature of an arc which extends through the one of the spaced apart points and the other of the spaced apart points and is tangent to the directed tangent line;

(d) drawing the arc between the one of the spaced apart points and the other of the spaced apart points using the center and radius of curvature determined in (c);

(e) forming a second arc between the one of the spaced apart points and a third point, using the steps (a) to (d) except the second tangent angle is determined without defining a second directed tangent line.

3. The method of claim 2 including the step of forming a mirror image of the smoothly shaped, non-circular, curve to form a closed figure.

4. The method of claim 2 including the step of using at least 10 points to form the smoothly shaped, non-circular, curve.

5. The method of claim 2 including the step of generating a third circular arc that extends through the third point and a fourth point and is tangent to the second circular arc at the third point.

6. The method of claim 2 wherein one of the points is moved to change the final shape of the curve.

7. The method of claim 2 including forming a final smoothly shaped, non-circular curve by forming a mirror image of the smoothly shaped, non-circular, curve.

8. The method of claim 2 wherein the center of the radius of curvature of the arc are off a designated drawing area by breaking an included angle between the two spaced apart points into a set of smaller included angles.

* * * * *